United States Patent [19]

Voliva et al.

[11] Patent Number: 4,473,380
[45] Date of Patent: Sep. 25, 1984

[54] POLLUTION CONTROL SYSTEM

[75] Inventors: Benjamin H. Voliva, Dolton; Irwin B. Bernstein, Homewood, both of Ill.

[73] Assignee: R. R. Donnelley & Sons Company, Chicago, Ill.

[21] Appl. No.: 355,764

[22] Filed: Mar. 8, 1982

Related U.S. Application Data

[63] Continuation-in-part of Ser. No. 200,542, Oct. 24, 1980, abandoned.

[51] Int. Cl.³ .................. B01D 47/00; B03C 3/00
[52] U.S. Cl. .................................. 55/8; 34/80; 55/90; 55/85; 55/259; 55/122
[58] Field of Search ............... 55/84, 85, 89, 90, 18, 55/10, 122, 7, 259; 34/79, 80, 75; 101/426; 106/20

[56] References Cited

U.S. PATENT DOCUMENTS

| | | | |
|---|---|---|---|
| 1,871,815 | 8/1932 | Meston et al. | 55/8 |
| 3,325,973 | 6/1967 | Illingworth | 55/90 |
| 3,369,344 | 2/1968 | Jackson et al. | 55/89 |
| 3,800,505 | 4/1974 | Tarves | 55/8 |
| 4,028,072 | 6/1977 | Braun et al. | 55/259 |
| 4,145,191 | 3/1979 | Kunchal et al. | 55/8 |
| 4,343,096 | 8/1982 | Bergland | 34/79 |
| 4,378,236 | 3/1983 | Helms | 55/89 |

FOREIGN PATENT DOCUMENTS

| | | | |
|---|---|---|---|
| 2511181 | 9/1976 | Fed. Rep. of Germany | 55/90 |
| 2756556 | 6/1979 | Fed. Rep. of Germany | 55/85 |
| 759493 | 10/1956 | United Kingdom | 55/8 |

OTHER PUBLICATIONS

Choosing the Right Ink for the Particular Job, General Printing Div. Sun Chem.-American Ink Maker, 4/1947, pp. 23-27.

Primary Examiner—Bernard Nozick
Attorney, Agent, or Firm—Wood, Dalton, Phillips, Mason & Rowe

[57] ABSTRACT

A pollution control system is disclosed wherein condensable pollutants are removed from a high-temperature gas stream by counterflow contact in a vertical tower with downwardly flowing, relatively cool absorbent oil. The absorbent is at a sufficiently low temperature so as to rapidly condense a portion of the pollutants in order to form a fog of fine droplets of pollutant entrained by the gas stream, which fog is incapable of being absorbed by the absorbent. The remainder of the condensable pollutants is removed by downwardly flowing absorbent oil, and the gas and entrained fog are directed from the tower to gas/droplet separation means, such as an electrostatic precipitator. The fog is thereby separated from the gas and substantially pollutant-free gas is discharged to the atmosphere.

5 Claims, 1 Drawing Figure

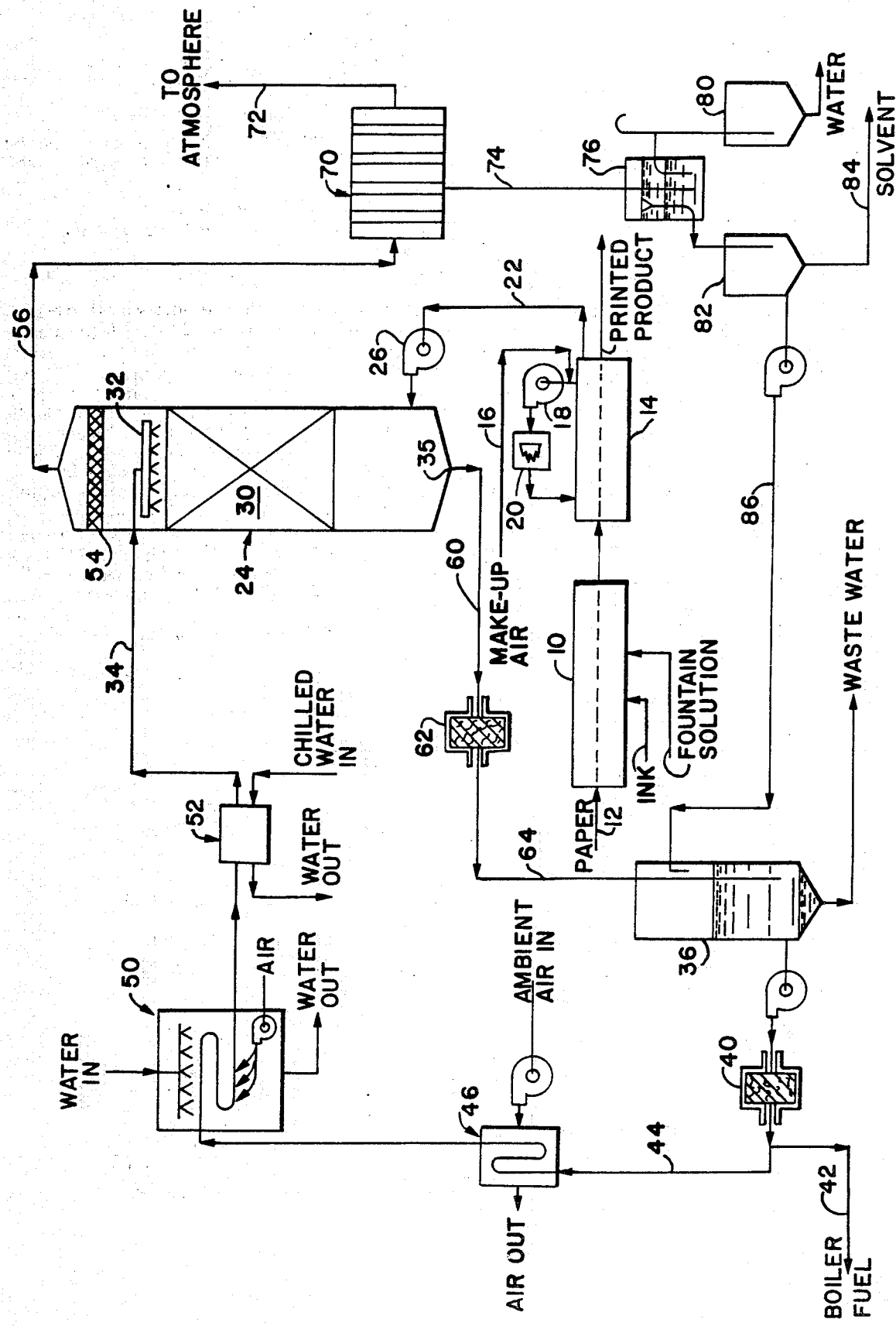

POLLUTION CONTROL SYSTEM

CROSS-REFERENCE TO RELATED APPLICATION

This is a continuation-in-part of copending, commonly assigned application Ser. No. 200,542 filed Oct. 24, 1980, now abandoned.

BACKGROUND OF THE INVENTION

1. Field of the Invention

This invention relates generally to a pollution control system and, more particularly, this invention relates to a method of removing condensable pollutant materials from a high-temperature gas stream.

2. Brief Description of the Prior Art

Pollution control processes utilizing counterflow of a liquid absorbent with a liquid or solid pollutant-laden gas stream to remove pollutants from the gas stream are well known. Further, pollution control processes utilizing electrostatic precipitators or equivalent means to separate particulate materials from gas streams are well known.

However, the inventors have discovered that, under certain circumstances, the application of counterflow gas-liquid contact pollution control procedures results in serious problems. Specifically, when the temperature difference between a polluted gas stream and a liquid absorbent stream is relatively high, certain types of condensable pollutants in the gas form a non-absorbable fog or mist. Under such circumstances, the fog cannot readily be eliminated by control of column height or absorbent or gas flow rate.

The inventors have discovered that cool counterflowing liquid absorbent causes such extremely rapid condensation of the vaporized material that formation of a fine fog of such material occurs, and that the fog is carried from the counterflow packed bed regardless of other process variables.

Further, both heat exchanger cooling surfaces and electrostatic precipitators or filters used in prior pollution control processes have exhibited a tendency to become fouled after only short periods of use.

Counterflow liquid-gas contact processes have not been successfully applied to the reduction or removal of pollutants from discharge streams of heatset printing press dryers. In prior practice, pollutants have been removed from such streams by means of afterburners, which operate at high temperatures and which burn natural gas or a similar fuel. The energy requirements of such burners are high.

SUMMARY OF THE INVENTION

The present invention is directed to overcoming one or more of the problems referred to above.

According to the present invention, condensable pollutants, which may have a variety of boiling points, are separated from a relatively high-temperature heatset printing press dryer exhaust gas stream by counterflow contact with a downwardly flowing liquid absorbent in a vertical tower where the absorbent is at a temperature sufficiently low to effect formation of a non-absorbable fine fog comprising a portion of the pollutants. The remainder of the pollutants, including substantially all of the higher boiling point materials, are absorbed by the absorbent and are removed from the tower therewith.

The fog flows with the gas stream upwardly through the tower to means for separating the fog from the gas, such as an electrostatic precipitator, for example, and the resulting substantially condensate-free gas is discharged to the atmosphere. Condensed material is recycled for use as absorbent or in the process from which the pollutants originated.

In the practice of the inventive process, heat exchanger cooling surfaces, electrostatic precipitator collector plate surfaces and filters do not exhibit fouling even after long periods of use.

Other aspects and advantages will be apparent from the following detailed description taken in conjunction with the drawings and the appended claims.

BRIEF DESCRIPTION OF THE DRAWING

The FIGURE is a schematic flow diagram of a preferred means for carrying out the invention to remove vaporized pollutants from offset printing press dryer exhaust stream.

DETAILED DESCRIPTION OF THE INVENTION

The process of the present invention is especially suitable for removal of vaporized pollutant materials, such as ink resins and solvent, for example, from the exhaust stream of heatset printing press dryer, such as the dryer of an offset printing press, as described below. However, it is to be understood that the process described and claimed herein is applicable to a variety of pollution control applications.

Various industrial exhaust gas streams contain polluting materials which must be removed from the streams prior to discharge of the streams to the atmosphere. In the case of heatset printing presses, ink is applied to paper in solution with an appropriate solvent, such as a petroleum-derived solvent or other organic solvent. One commonly used type of ink solvent is a petroleum fraction having an initial boiling point of about 460° F. sold by Magie Bros. Co. of Franklin Park, Ill. under the trade designation "Magie 470". "Magie 470" solvent has a boiling point range of about 460° F.–520° F.

Other useful ink solvents have initial boiling points ranging from about 440° F. to about 650° F., and the present invention applies to systems using such solvents.

In the cases of offset printing and direct lithography (also known as "di-litho") an aqueous fountain solution is also used.

After ink and, if appropriate, fountain solution are applied to paper in a press, solvent and fountain solution volatiles are evaporated in a hot air dryer. The drying process also results in thermal degradation and partial oxidation of resins found in residual ink to produce material known as "tar" in the printing industry. This tar generally has a boiling point of 600° F. or greater. These partially oxidized and degraded resins are vaporized in the dryer and are carried with vaporized solvent and water vapor from the dryer in an exhaust air stream. The solvent and resins must be removed from the stream prior to discharge of the stream to the atmosphere.

Referring to the FIGURE, the preferred embodiment of a method for removing virtually all vaporized solvents and resins from a dryer exhaust stream is schematically represented. In the FIGURE, ink (which is understood to include a petroleum or organic solvent, such as "Magie 470" solvent) and a fountain solution are fed to a web offset printing press 10. A paper stream 12 is directed through the press 10 and is delivered to a hot air dryer 14 carrying ink (including solvent) and fountain solution.

The solvent and fountain solution are removed from the paper 12 by evaporation in the dryer 14. Make-up air 16 is delivered by a fan 18 to a heater 20 and therefrom to the dryer 14.

An exhaust air stream 22 at a temperature of between about 275° F. and 450° F., generally around 400° F., carries vaporized solvent and fountain solution, along with thermally degraded and partially oxidized ink resins, from the dryer 14. The dried printed product exits the dryer 14 for further operations.

The stream 22 is introduced to a vertical contact tower, illustratively a packed tower 24, by an exhaust fan 26. The tower 24 contains a packed bed 30. The packed bed 30 may experience thermal shock due to the relatively high temperature difference between the air stream 22 and liquid absorbent. Therefore, the packed bed 30 preferably comprises metal packing elements, such as metal rings, for example.

Overlying the packed bed 30 is a liquid distributor 32. Relatively cool liquid absorbent, which is preferably identical to the ink solvent (illustratively "Magie 470" petroleum solvent), is delivered to the distributor 32 by line 34 for distribution over the bed 30. The absorbent flows downwardly through the bed 30 to a lower tower exit 35.

Absorbent is provided to the tower 24 as follows. A solution of relatively warm (e.g. 200° F.) absorbent and dissolved ink tar is pumped from a recirculation tank 36 through a filter 40 to remove residual solids. The absorbent (with dissolved tars) pumped from the tank 36 is suitable for use as boiler fuel or other fuel, as desired, and limited quantities thereof may be removed from the system via line 42 for that purpose. Such limited removal is desirable as additional solvent and tars are continuously provided to the system from the press dryer exhaust stream 22.

Absorbent flows from the filter 40 through line 44 to an air/oil heat exchanger 46 wherein it is cooled by contact with ambient air. The absorbent is further cooled in an evaporative heat exchanger 50. The temperature of the absorbent as it exits the heat exchanger 50 should be less than about 90° F. (The absorbent may be cooled further to about 75° F. by flow through a chilled water/absorbent heat exchanger 52, if desired.)

As cool absorbent at a temperature of about 90° F. or below is distributed over the packed bed 30 by the distributor 32 and flows downwardly through the bed 30, it contacts in counterflow polluted dryer exhaust air delivered to the tower 24 by the fan 26. Due to the very high temperature difference between the absorbent and the exhaust air, very rapid condensation of the solvent and ink tars carried by the exhaust air occurs near the bottom of the packed bed 30. Condensation of ink tars is very rapid and virtually all of the tars present in the dryer exhaust are condensed and deposited on the absorbent-wetted packing material in the bed 30 for dissolution in, and hence removal from the tower 24 by, downwardly flowing absorbent. Only limited water condensation takes place in the bed 30; the great majority of the water present in the exhaust air remains in vapor form.

The extremely rapid condensation of solvent results in the formation of a fog of extremely small (<1 micron diameter) solvent droplets which are carried upwardly through the packed bed 30 by the air stream. The fog of small solvent droplets is not absorbable by the absorbent stream, but rather is carried from the top of the packed bed 30 and the tower 24 through a demister 54 and a line 56. The demister 54 removes only relatively large entrained droplets and any entrained solids from the air stream. The air/fog stream in line 56 contains little or no ink tar but is unsuitable for discharge to the atmosphere due to the presence of the solvent fog.

Surprisingly, it has been found that the solvent fog is not absorbable by counterflowing absorbent regardless of column height, variations in air or absorbent flow rates, or surface area of the packing in the bed 30.

Absorbent, a minor amount of condensed water, and dissolved ink tars flow from the bottom of the tower 24 through a line 60 to a strainer 62 which removes entrained solids. The absorbent, tar and water flow from the strainer 62 to the recirculation tank 36 through a line 64. Absorbent and dissolved tars are decanted from the tank 36 and recycled for use in the system or as boiler fuel, as described above. Waste water is removed from the recirculation tank 36 for disposal.

The fog and water vapor-laden air stream in line 56 is directed from the tower 24 to appropriate means 70 for separating the solvent fog droplets from the air stream. Preferably, the fog/air separation means comprises an electrostatic precipitator, as shown, but may comprise an equivalent separator. One equivalent separator is an electrostatically charged reticulated fiber filter such as obtainable from the Calvert Environmental Equipment Company of San Diego, Calif. Other high efficiency filters are also believed to be effective.

The majority of the water vapor introduced to the packed bed 30 passes through the bed 30 without condensing. Water vapor condensed in the tower 24 is carried from the tower as waste through line 60, or forms a portion of the solvent fog collected in the separator 70. All water vapor entering the separator 70 passes therethrough without change, and is discharged to the atmosphere as indicated at 72.

Only about 10% or less of the solvent entering the separator 70 is discharged to the atmosphere.

The discharge to the atmosphere from line 72 has been found to be uniformly characterized by less than 20% opacity and less than 0.2 grains/scf particulate matter under all useful operating conditions. The major cause of any opacity is believed to be the presence of water vapor in the discharge.

The great majority of the solvent entering the separator 70 is collected and is discharged from the separator at 74 and flows to a decanter 76. Waste water is separated from the solvent and is directed to a water recovery tank 80. Condensed and collected solvent is removed from the decanter 76 and directed to a solvent recovery tank 82 for removal as an ink solvent as indicated at 84, or for recycle in the pollution control system by introduction to the tank 36 through a line 86.

An important aspect of the inventive process described above is that solvent recovered from the decanter 76 is substantially free of ink tars and other contaminants. A further important aspect of the inventive process is the absence of fouling of apparatus surfaces, including heat exchanger cooling surfaces and surfaces of the separator 70, by tars and other contaminants.

It will be appreciated that the process described above requires very little energy and is characterized by relatively low capital cost requirements. The operation of the process is simple, and the process provides several sources of useful heat recovery. Further, the system is easily adaptable to control of multiple sources of pollution, and system efficiency is not adversely by high concentrations of pollutants in the gas stream to be cleaned.

EXAMPLE

Referring to the FIGURE, exhaust gas from a web offset printing press dryer 14 is cleaned according to the process described above. The dryer exhaust in line 22 contains 34,900 lb/hr. air, 879 lb./hr. water vapor, and 60 lb./hr. "Magie 470" oil with about 1 lb./hr. volatilized ink tars. The exhaust gas temperature is 400° F. The gas is introduced to the bottom of a 21 ft. tall packed tower 24 with an inner diameter of 7 ft. and a 9 ft. tall packed bed 30. The packing material is 1" Hy-Pak ® metal rings obtained from Norton Co.

Absorbent oil at 220° F. containing dissolved ink tars is pumped from the recirculator tank 36 and through the strainer 40 at 40,033 lb./hr. 13 lb./hr. oil and dissolved ink tar is removed through the line 42 for use as boiler fuel. 40,020 lb.hr. oil at 220° F. is contacted with 6,000 cfm air at 90° F. in the air/oil heat exchanger 46. The air and oil exits the heat exchanger 46 at 210° F. and 180° F., respectively.

The oil then enters the evaporative cooler 50 into which 3,000 lb./hr. water at ambient temperature enters and 1,000 lb./hr. water exits. The oil temperature is reduced to 80° F. in the cooler. The oil then flows through the chilled water/oil heat exchanger 52. 20 gal./min. chilled water at 50° F. flows countercurrently to the oil and exits the heat exchanger at 75° F. The oil flowing from the heat exchanger 52 enters the liquid distributor 32 at 75° F. and is contacted with exhaust gas in countercurrent flow.

The gas in line 56 exits the tower 24 and contains 34,900 lb./hr. of air, 869 lb./hr. water and 139 lb./hr. oil at 80° F. This stream flows through the electrostatic precipitator 70 and the cleaned air stream in line 72 and contains 34,900 lb./hr. air, 779 lb./hr. water vapor and 9 lb./hr. oil vapor at 80° F. 130 lb./hr. liquid oil and 90 lb./hr. liquid water flow to the decanter 76 from the precipitator 70. 38 lb./hr. clean oil is recovered from the tank 82 through the line 84 for reuse as solvent. 92 lb./hr. clean oil is pumped from the tank 82 to the tank 36.

39,938 lb./hr. oil (with dissolved tars) and 10 lb./hr. condensed water flows from the bottom of the tower 24 to the recirculation tank 36. 10 lb./hr. waste water is removed from the tank 36 for disposal.

Due to the absence of dissolved ink tars from the fogladen air stream entering the precipitator 70, the collector plates of the precipitator 70 require no maintenance and absolutely no fouling of the plates is experienced.

The foregoing detailed description is given for clearness of understanding only and no unnecessary limitations are to be implied therefrom as modifications will be obvious to those skilled in the art.

We claim:

1. A method of removing condensable pollutants from a polluted heatset printing press dryer exhaust gas stream, said gas stream having a temperature above about 275° F. and said pollutants comprising a vaporized petroleum-derived ink solvent or other organic ink solvent having an initial boiling point of about 440° F. or above and thermally degraded and partially oxidized ink resins, said method comprising the steps of:
    (a) causing said polluted gas stream to flow upwardly through a vertical tower having a packed bed;
    (b) simultaneously causing a liquid absorbent comprising a liquid petroleum fraction or organic material having a temperature about 90° F. or below to flow downwardly through said packed bed to interact with said gas stream to rapidly condense said vaporized ink solvent to deposit said ink resins on said packed bed, whereby at least a portion of said condensed ink solvent forms a fog entrained in said gas stream which is incapable of absorption by said absorbent, and said deposited resins and the remainder of said solvent are absorbed by said absorbent; and
    (c) directing said gas stream and entrained fog from said tower to means for separating said fog droplets from said gas whereby said fog is separated from said gas to provide a clean liquid which is suitable for recycling for use as an ink solvent.

2. The method of claim 1 wherein said liquid absorbent is substantially identical to said ink solvent.

3. The method of claim 1 wherein said means for separating said fog droplets from said gas comprises an electrostatic precipitator.

4. A method of removing condensable pollutants from a polluted heatset printing press dryer exhaust gas stream, said gas stream having a temperature above about 275° F. and said pollutants comprising a vaporized petroleum-derived ink solvent or other organic ink solvent having an initial boiling point of about 440° F. or above and thermally degraded and partially oxidized ink resins having boiling points greater than about 600° F., said method comprising the steps of:
    (a) causing said polluted gas stream to flow upwardly through a vertical tower having a packed bed;
    (b) simultaneously causing a liquid absorbent comprising a liquid petroleum fraction or organic material substantially identical to said vaporized ink solvent carried in said gas stream and having a temperature about 90° F. or below to flow downwardly through said packed bed to interact with said gas stream to rapidly condense said vaporized ink solvent to deposit said ink resins on said packed bed, whereby at least a portion of said condensed ink solvent forms a fog entrained in said gas stream which is incapable of absorption by said absorbent, and said deposited resins and the remainder of said solvent are absorbed by said absorbent; and
    (c) directing said gas stream and entrained fog from said tower to means for separating said fog droplets from said gas whereby said fog is separated from said gas to provide a clean liquid which is suitable for recycling for use as an ink solvent.

5. The method of claim 4 wherein said means for separating said fog droplets from said gas comprises an electrostatic precipitator.

* * * * *